(No Model.) 3 Sheets—Sheet 1.
C. M. BRUFF.
RECORDING WEIGHING SCALE.
No. 492,708. Patented Feb. 28, 1893.
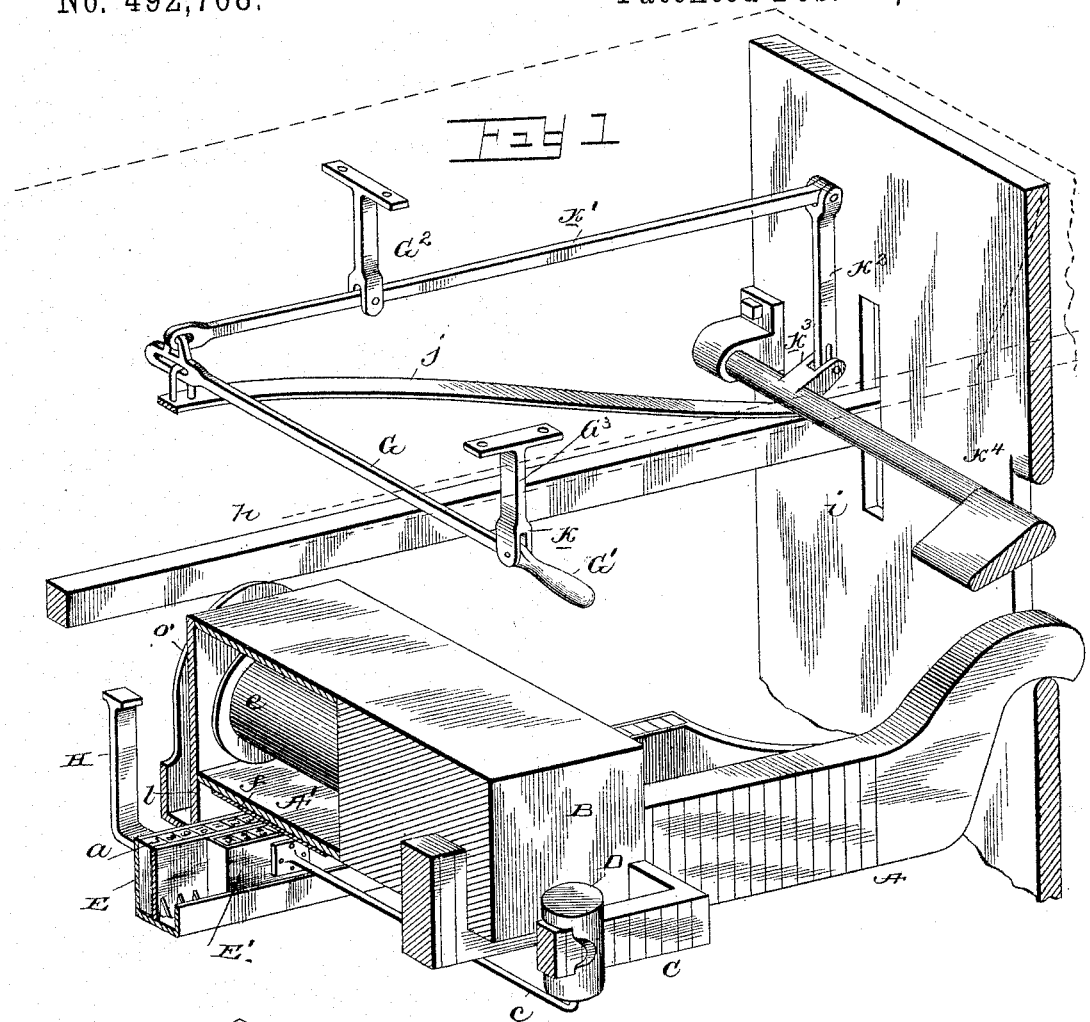
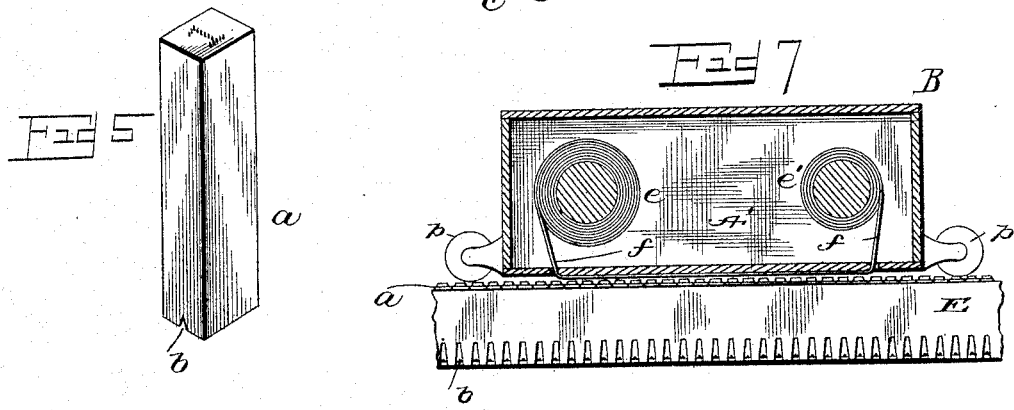
Witnesses
John Danirie
C. F. Downing
Inventor
Charles M. Bruff
By H. A. Seymour
Attorney.

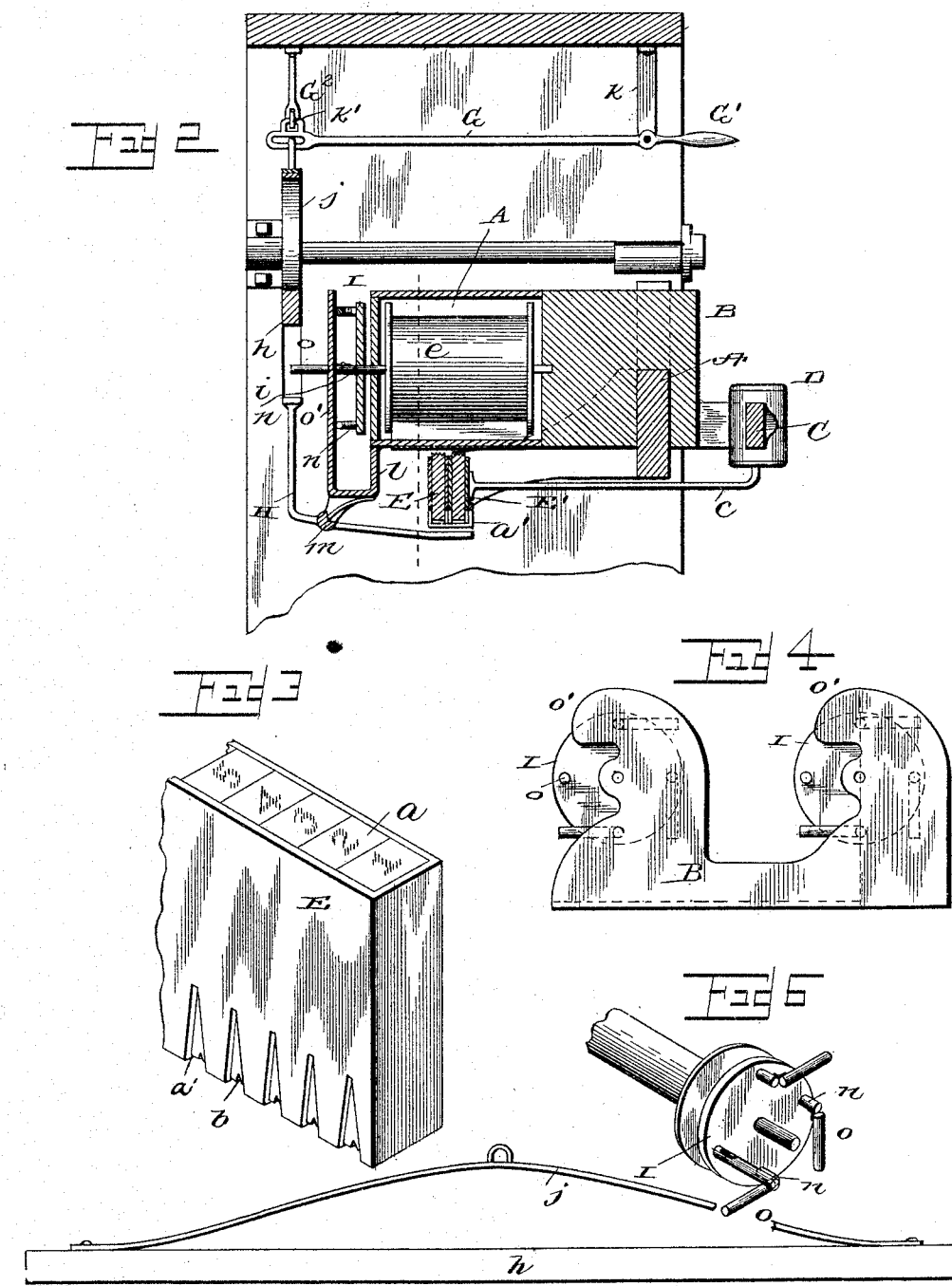

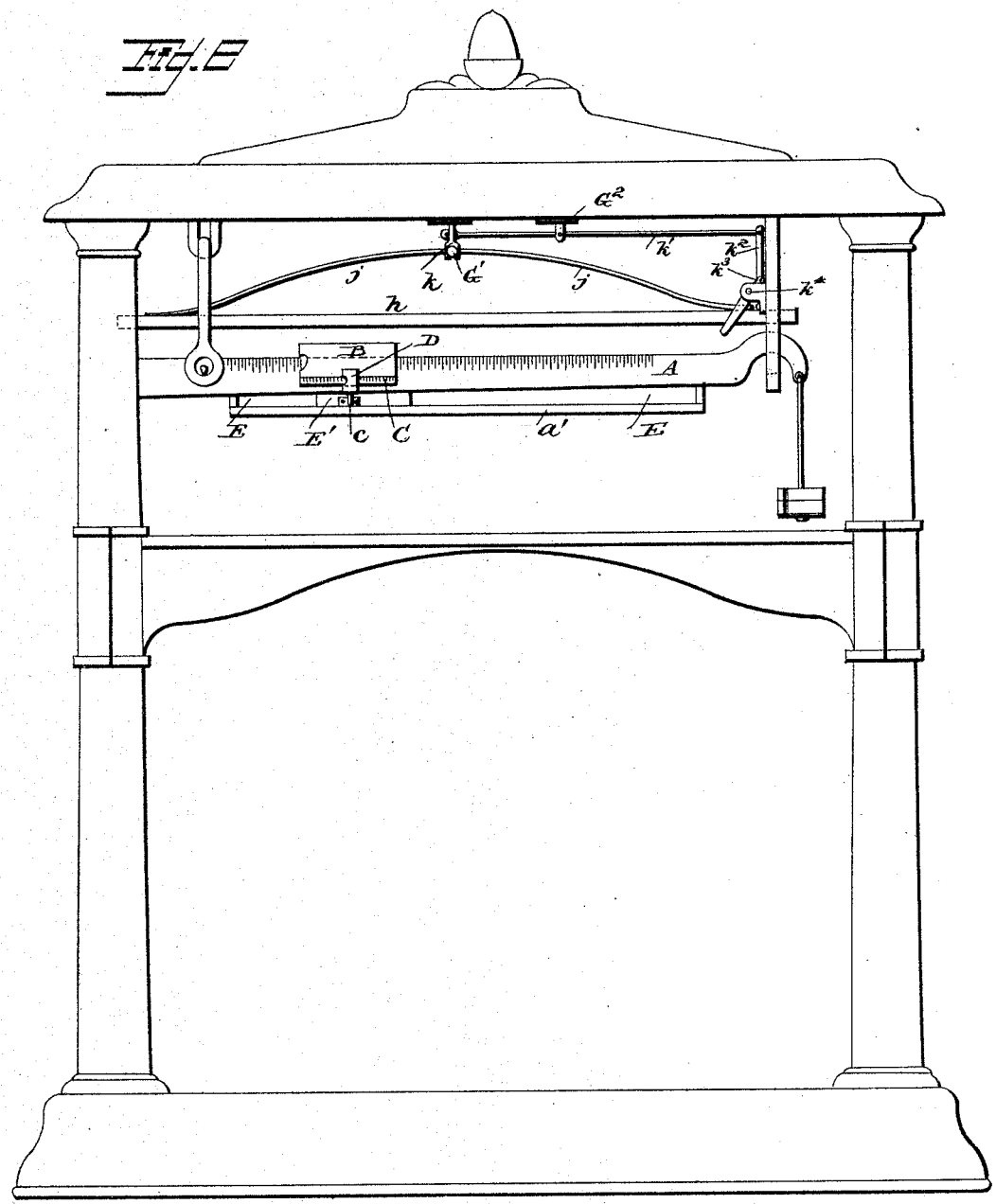

UNITED STATES PATENT OFFICE.

CHARLES M. BRUFF, OF CUMMINGS, ILLINOIS.

RECORDING WEIGHING-SCALE.

SPECIFICATION forming part of Letters Patent No. 492,708, dated February 28, 1893.

Application filed May 10, 1892. Serial No. 432,484. (No model.)

*To all whom it may concern:*

Be it known that I, CHARLES M. BRUFF, residing at Cummings, in the county of Cook and State of Illinois, have invented certain new and useful Improvements in Apparatus for Checking or Registering Weights; and I do hereby declare the following to be a full, clear, and exact description of the invention, such as will enable others skilled in the art to which it appertains to make and use the same.

My invention relates to an improvement in weighing apparatus and more particularly to devices for checking weights,—the object of the invention being to produce simple and efficient means whereby the weight of an object can be easily and quickly checked or registered.

With this object in view the invention consists in certain novel features of construction and combinations and arrangements of parts as hereinafter set forth and pointed out in the claims.

In the accompanying drawings, Figure 1 is a perspective view illustrating the invention, partly in section. Fig. 2 is a transverse sectional view. Figs. 3, 4, 5, 6 and 7 are detail views: and Fig. 8 is a detached view of rod or bar $h$ and bracket $j$. Fig. 9 is a side elevation of scales embodying my improvement.

A represents a scale beam similar to those employed in scales for weighing heavy bodies, and is supported in framework of usual construction and arrangement. On the main scale beam A, a poise B is mounted and adapted to slide, and carries an auxiliary scale beam C, which latter carries an auxiliary poise D.

Carried by the main beam A and projecting laterally therefrom, is a narrow receptacle E, in which a series of type $a$ is located and adapted to have a vertical movement, said type preferably being composed of a number of points adapted to puncture a tape hereinafter referred to. The upper portion of the receptacle E is entirely open so that the type can have a movement past the top of said receptacle,—while the lower portion of the receptacle is provided with inwardly projecting flanges $a'$ on which the type normally rest. The sides of the receptacle are preferably cut away as shown in Fig. 3. The bottom of the type are preferably provided with notches or recesses $b$ for the reception of the edge of a lever, hereinafter referred to. A bracket $c$ is secured at one end to the auxiliary poise D and extends rearwardly to a point in proximity to the receptacle. To the rear end of the bracket $c$ is attached an auxiliary receptacle E' for the reception of type, which receptacle moves in a grooved plate attached to or projecting from the receptacle E,—said type being arranged in the receptacle E' inversely to the graduations on the auxiliary scale beam.

The main poise B is made to extend over the receptacle E, E' and in its rear portion is made with a chamber A'. In this chamber two rolls or drums $e$, $e'$, are located, over which a tape or strip of paper $f$ passes, said tape being adapted to be wound from one to the other and passes through slots in the bottom of the chamber A', thus affording a smooth, solid surface for the type to press against and avoids tearing the tape. This tape is adapted to have the weight of the object being weighed produced on it by the type in the receptacles E, E'.

A rod or bar $h$, is mounted to have a vertical sliding movement in uprights $i$ of the frame of the apparatus, and has a bracket $j$ secured thereto in proximity to its ends. A lever G having a weighted handle G', is pivoted at $k$ to a bracket $G^3$ secured to the framework of the scales, and connected at its forward end to the bracket $j$, at a point preferably between the ends of the latter.

Pivoted at a point between its ends to the lower end of a bracket $G^2$, secured to the framework of the scales, is a lever $k'$, one end of which is connected to the lever G at the point where the lever G is connected to bracket $j$ and at the other end is connected to a bar or rod $k^2$, which extends to the end of the frame of the scales and has a sliding connection with an arm $k^3$ projecting from the guard $k^4$.

An arm $l$ projects from one end of the main counterpoise B and pivotally supports a lever H having a stop $m$ to limit its vibration. One end of the lever H is preferably made heavier than the other end, projects under the receptacles E, E', and has a comparatively sharp edge adapted to engage in the notches in the type in said receptacles. The other end of the lever H projects under and in line with the movement of the rod or bar $h$. From this construction it will be seen that when the lever G is operated the guard $k^4$ will be lowered and caused to lock the scale beam and at the same operation the bar or rod $h$ will be lowered and made to engage one end of the lever H, the other end being elevated and caused to raise the type in the two receptacles and thus print or produce the amount of the weight on the tape or strip in the main counterpoise B.

Secured to the shafts of the drums or rolls $e$, $e'$ are wheels I, I, from each of which a series of lugs $n$ project as shown in Fig. 6. Hinged to each lug $n$ so as to normally project outwardly from the wheels I, is an arm $o$. A curved plate or guard $o'$ is located in proximity to each wheel I and adapted to be struck by the arms $o$ and turn them inwardly during the lowest part of their revolution, so that the bar $h$ will escape them at the lowest part of the revolution. It will be seen that when the lever G is operated the amount of the weight will be registered on the tape or paper strip in the main poise, the guard $k^4$ will be lowered and the said rod or bar $h$ will strike one of the outwardly projecting hinged arms $o$ on each wheel I, and turn the wheels I, I, and consequently the rolls or drums carrying the tape or strip, one quarter revolution, thus causing the tape or strip to move along after the weight is registered, and present a fresh space for the next registration, the tape being unwound from one drum and wound upon the other. The lever H being located below the type receptacles, the wheels I will be operated before the lever H, and thus the tape will always present a fresh surface for the type, which tape will not be in motion when struck by the type.

The receptacle E, instead of being carried by the main scale beam, may be carried by uprights independent of the said scale beam, so that it may be applied to any scale already manufactured without material change thereto.

The type may be made similar to ordinary printing type as shown in Fig. 5, and ink pads $p$ secured to the ends of the chamber A', for supplying them with ink.

The apparatus is very simple in construction, easy of operation and effectual in the performance of its functions.

This invention is also applicable to scales employing but a single scale beam and poise.

Having fully described my invention, what I claim as new, and desire to secure by Letters Patent, is—

1. The combination with a main scale beam, a poise carried thereby, an auxiliary scale beam carried by said poise, and an auxiliary poise carried by said auxiliary scale beam, of a receptacle containing type adapted to register with the graduations on the main scale beam, and a receptacle containing type corresponding with the registrations on the auxiliary scale beam, a tape and means for pressing said type against the tape to register the weight of a body, substantially as set forth.

2. The combination with a scale beam, of a poise thereon, a tape carried by said poise, a type arranged beneath said poise and adapted to register with the graduations on the scale beam and means for pressing said type against the tape, substantially as set forth.

3. The combination with a scale beam, of a poise thereon, a tape carried by said poise, a type receptacle carried by the scale beam and disposed beneath said poise, movable type in said receptacle adapted to register with the graduations on the scale beam and means for pressing said type against the tape, substantially as set forth.

4. The combination with a scale beam, of a poise thereon, a tape carried by said poise, a type receptacle carried by the scale beam and disposed beneath said poise, movable type consisting of needle points, in said receptacle and adapted to register with the graduations on the scale beam and means for forcing said type up against the tape and cause them to puncture said tape in the form of figures which they respectively represent, substantially as set forth.

5. The combination with a scale beam, of a poise thereon, a tape carried by said poise, a type receptacle carried by the scale beam and disposed beneath said poise, movable type in said receptacle adapted to register with the graduations on the scale beam, a lever adapted to engage said type at one end and means for depressing the other end of said lever, substantially as set forth.

6. The combination with a horizontal scale beam and a poise, of a receptacle carried by said beam and containing movable type, a tape, a lever adapted at one end to engage said type, a bar adapted to engage the other end of said lever to press the type into contact with said tape, and a lever for depressing said bar, substantially as set forth.

7. The combination with a scale beam and a poise, of a receptacle containing type, a tape, a lever adapted at one end to engage said type, a bar adapted to engage the other end of said lever to press the type into contact with said tape, a bracket carried by said bar, and a pivoted lever attached at one end to said bracket, substantially as and for the purpose set forth.

8. The combination with a scale beam, of a poise thereon, a tape carried by said poise, a type receptacle carried by the scale beam and disposed beneath the poise, type in said receptacle, an arm projecting from the poise, a lever pivotally supported by said arm, a stop to limit the movement of said lever, and means for depressing one end of said lever to cause its other end to strike the type and force them against the tape, substantially as set forth.

9. The combination with a scale beam and a poise, of a receptacle, type in said receptacle and provided in their bottoms with recesses, a pivoted lever having a knife edge at one end adapted to enter the recesses in the type, and means for operating said lever to press the type against the tape, substantially as set forth.

10. The combination with a scale beam and a scale beam guard, and a poise, of a receptacle containing type, a tape, a lever adapted to engage said type to press them against the tape, a bar adapted to engage said lever, a bracket connected to said bar, a pivoted lever connected at one end to said bracket, a lever pivoted between its ends and connected to said pivoted lever and the bracket, and a bar or rod extending from the lever pivoted between its ends, to an arm on the scale beam guard, substantially as set forth.

11. The combination with a scale beam and a poise, of receptacles containing type, means for engaging said type to press them against the tape, rolls, a tape passing over said rolls, a wheel carried by the shafts of each roll, and arms carried by said wheels, and means for engaging said arms to rotate the rolls and move the tape, substantially as set forth.

12. The combination with a scale beam and poise, of rolls carried by said poise, a tape carried by said rolls, type located beneath said tape, means for pressing said type against the tape, a wheel carried by each of said rolls, lugs or projections on one face of said wheel, arms hinged to said lugs or projections, means for engaging said arms to turn the rolls and move the tape, and a guard adapted to cause the hinged arms not in position to be engaged to be turned back, substantially as described.

13. The combination with a scale beam and a poise, and a scale beam guard, of tape rolls carried by said poise, a wheel carried by the shaft of one of said rolls, arms carried by said wheel, receptacles located under the poise and carrying type, a pivoted lever adapted to engage said type to press them against the tape, and means for closing the scale guard, engaging the arms on the wheel secured to the roll shaft to move the tape, and operating said lever to press the type against the tape, at a single operation, substantially as set forth.

14. The combination with a scale beam and a poise, of a receptacle carried by the main scale beam, type in said receptacle arranged coincident with the registrations on the main scale beam, an auxiliary scale beam carried by the main poise, an auxiliary poise carried by the auxiliary scale beam, a receptacle carried by the auxiliary poise, type arranged in said auxiliary receptacle inversely to the graduations on the auxiliary scale beam, a tape and means for pressing the type in both receptacles simultaneously against the tape, substantially as set forth.

In testimony whereof I have signed this specification in the presence of two subscribing witnesses.

CHARLES M. BRUFF.

Witnesses:
JOHN P. GEHRING,
JOHN NIEMZIK.